(12) United States Patent
Friedl et al.

(10) Patent No.: US 7,121,791 B2
(45) Date of Patent: Oct. 17, 2006

(54) MAIN GAS DUCT INTERNAL SEAL OF A HIGH-PRESSURE TURBINE

(75) Inventors: Winfried-Hagen Friedl, Berlin (DE); Joerg Au, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 55 days.

(21) Appl. No.: 10/828,502

(22) Filed: Apr. 21, 2004

(65) Prior Publication Data
US 2005/0095122 A1 May 5, 2005

(30) Foreign Application Priority Data
Apr. 25, 2003 (DE) .................. 103 18 852

(51) Int. Cl.
F04D 29/08 (2006.01)
F03B 11/00 (2006.01)
(52) U.S. Cl. ................. 415/174.5; 415/115
(58) Field of Classification Search ........... 415/173.1, 415/173.3, 173.5, 173.7, 174.5, 115
See application file for complete search history.

(56) References Cited

U.S. PATENT DOCUMENTS

| | | | |
|---|---|---|---|
| 4,425,079 A | 1/1984 | Speak et al. | |
| 5,967,745 A * | 10/1999 | Tomita et al. | 415/173.7 |
| 6,431,827 B1 * | 8/2002 | Wolfe et al. | 415/173.3 |
| 6,779,972 B1 * | 8/2004 | Farrell et al. | 415/174.5 |
| 6,837,676 B1 * | 1/2005 | Yuri et al. | 415/115 |

FOREIGN PATENT DOCUMENTS

DE   3130573   4/1982

OTHER PUBLICATIONS

German Search Report dated Aug. 26, 2003.
Bohn, D., Radseitenraumsperrung II. In: FVV-664, 1998, Abb.2.1, S.89, 111.

* cited by examiner

Primary Examiner—Edward K. Look
Assistant Examiner—Dwayne J White
(74) Attorney, Agent, or Firm—Timothy J. Klima

(57) ABSTRACT

A high-pressure turbine of a gas-turbine engine provided with a turbine disk (1) carrying rotor blades (2) and with stator blades (3), and with a lateral wheel cavity (5) being formed between the turbine disk (1) and the stator ring (4), wherein a seal (8) is provided in axial direction between stator blade platforms (6) and rotor blade platforms (7) and which is arranged radially outwardly adjacent a main gas duct (9).

5 Claims, 2 Drawing Sheets

MAIN GAS DUCT INTERNAL SEAL OF A HIGH-PRESSURE TURBINE

This application claims priority to German Patent Application DE10318852.5 filed Apr. 25, 2003, the entirety of which is incorporated by reference herein.

BACKGROUND OF THE INVENTION

This invention relates to a high-pressure turbine of a gas-turbine engine.

More particularly, this invention relates to a high-pressure turbine of a gas-turbine engine with a main gas duct internal seal. Specifically, a turbine disk which carries the rotor blades is provided. Furthermore, the high-pressure turbine comprises, as usual, stator blades attached to a stator ring. A lateral wheel cavity is formed between the turbine disk and the stator ring.

On high-pressure turbines, the lateral wheel cavity must always be sealed appropriately against the main gas duct to enable cooling air for the cooling of the rotor blades to be fed via the lateral wheel cavity. The known designs of sealing arrangements have different overlaps between the platforms of the rotor blades and those of the stator blades. Here, the size of the gaps is such that the pressure of the main gas duct is essentially imparted to the lateral wheel cavity. With simple seal designs, the pressure disadvantageously is incapable of feeding a leading-edge cooling film for the rotor blades. To overcome these disadvantages, solutions are provided in the state of the art in which the lateral wheel cavity is divided into individual chambers by means of different seals. In these solutions, the mass flow for blade cooling is usually provided from a radial inner chamber, while a radial outer chamber primarily serves to prevent hot gas from flowing in from the main gas duct.

Here, it is disadvantageous that, in particular, the outer chamber, which is located at one of the hottest zones of the high-pressure turbine outside the main gas duct, is flushed by only a very low mass flow. Furthermore, this mass flow is additionally heated on its passage through a seal. All these factors result in a high thermal load of the turbine disk (disk rim of the first stage of the high-pressure turbine). This, in turn, entails a severe limitation of the life of the turbine disk.

BRIEF SUMMARY OF THE INVENTION

In a broad aspect, the present invention provides a high-pressure turbine of a gas-turbine engine of the type specified above which avoids the disadvantages of the state of the art and provides for adequate blade cooling, while being simply designed, inexpensively producible and highly reliable in operation.

It is a particular object of the present invention to provide solution to the above problems by the combination of the features described herein. Further advantageous embodiments of the present invention will be apparent from the description below.

The present invention, accordingly, provides for the arrangement of an efficient seal between stator blade platforms and rotor blade platforms in which the rotor blade platform is used as a seal runner. The seal extends essentially in the axial direction and is located radially outward adjacent to the main gas duct.

The seal can be of the labyrinth or brush-type. In the first case, the rotor blade platforms can carry the labyrinth tips and the stator blade platforms the stationary counterpart. If the seal is of the brush-type, the brush element is, for example, attached to the stator blade platform and, in this case, can be segmented.

The design according to the present invention enables the pressure in the lateral wheel cavity, in particular in the radial outward zone of the lateral wheel cavity, to be increased in relation to the main gas duct. This enhances the supply of cooling air to the rotor blades. In turn, the thermal situation is improved, enabling the overall temperature of the air in the rotating system to be lowered. In consequence, the temperature of the turbine disk, in particular in the disk rim area, can be lowered considerably. This results in a lower thermal load of the turbine disk and, consequently, an increase of its life.

In addition, pre-swirl nozzles can be provided radially further outward. Thus, temperature reduction of the cooling air by the pre-swirl effect is further improved.

BRIEF DESCRIPTION OF THE DRAWINGS

The present invention is more fully described in the light of the accompanying drawings showing preferred embodiments. In the drawings, FIG. 1 (Prior Art) is an embodiment according to the state of the art.

DETAILED DESCRIPTION OF THE INVENTION

Figure 1:
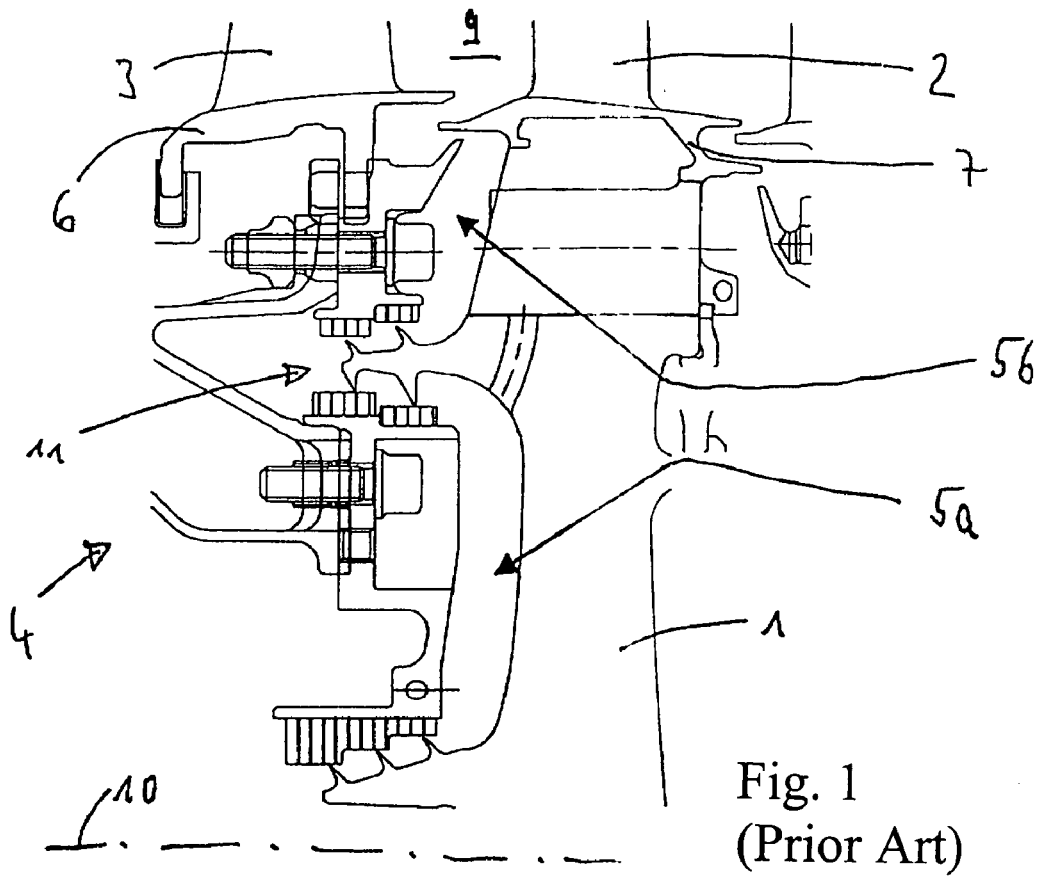

In accordance with the present invention, a turbine disk 1 is provided which carries rotor blades 2 of which each has a rotor blade platform 7. The turbine disk 1 rotates around a schematically shown center axis 10. Upstream of the rotor blades, stator blades 3 are arranged which are mounted to a stator ring 4. The stator blades 3, as usual, comprise stator blade platforms 6. As also illustrated in FIG. 1, a seal 11 is provided which separates an outer chamber 5b from an inner chamber 5a. Both chambers 5a, 5b together form a lateral wheel cavity 5.

As to the further design details, reference is made to the designs known from the state of the art.

Figure 2:
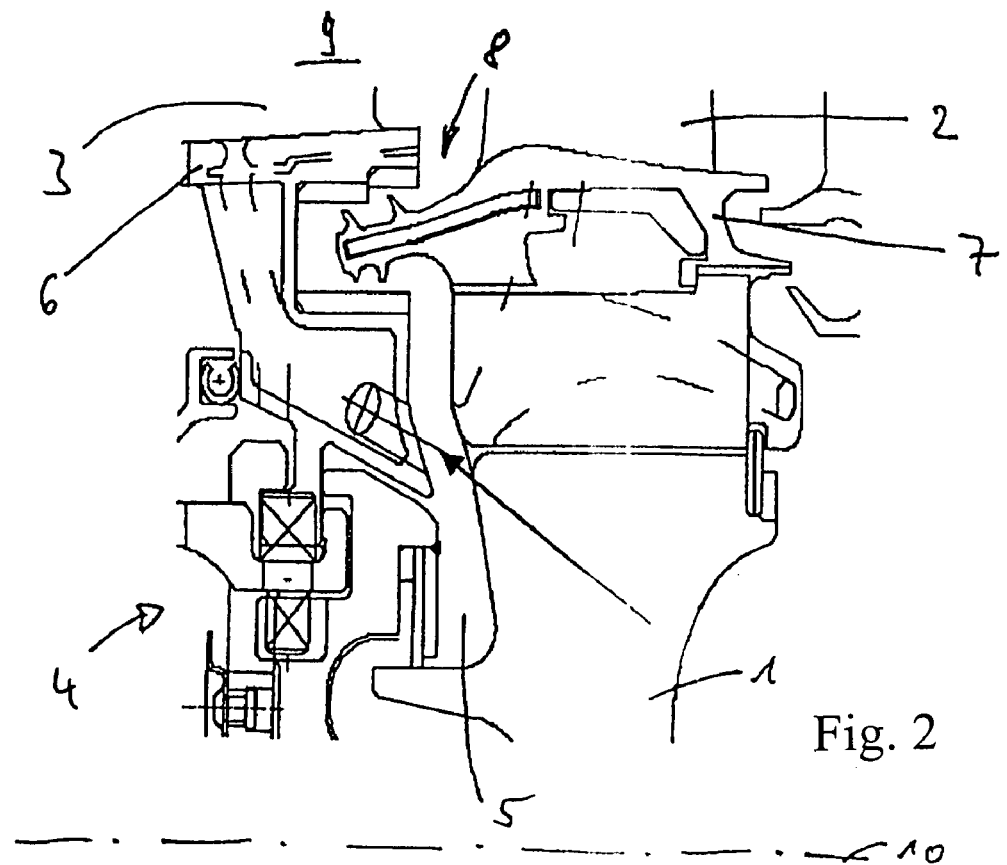
FIG. 2 is a partial longitudinal section, analogically to FIG. 1, of an embodiment in accordance with the present invention.

FIG. 2 shows a first embodiment according to the present invention, with same parts being given the same reference numerals.

As becomes apparent from FIG. 2, in particular, the lateral wheel cavity 5 is separated from the main gas duct 9 by means of a radially outward seal 8. This results in a one-piece form of the lateral wheel cavity 5. Since this lateral wheel cavity 5 is not divided by additional seals or the like, pre-swirl nozzle and cooling air entry into the rotor blades can be arranged on one radius and losses minimized.

In the first embodiment shown in FIG. 2, the seal according to the present invention is of the labyrinth-type and arranged between the stator blade platform 6 and the rotor blade platform 7. It essentially lies on a constant radius, i.e. the seal extends on an essentially concentric circle and is not divided into several, radially offset seals, as known from the state of the art.

Figure 3:
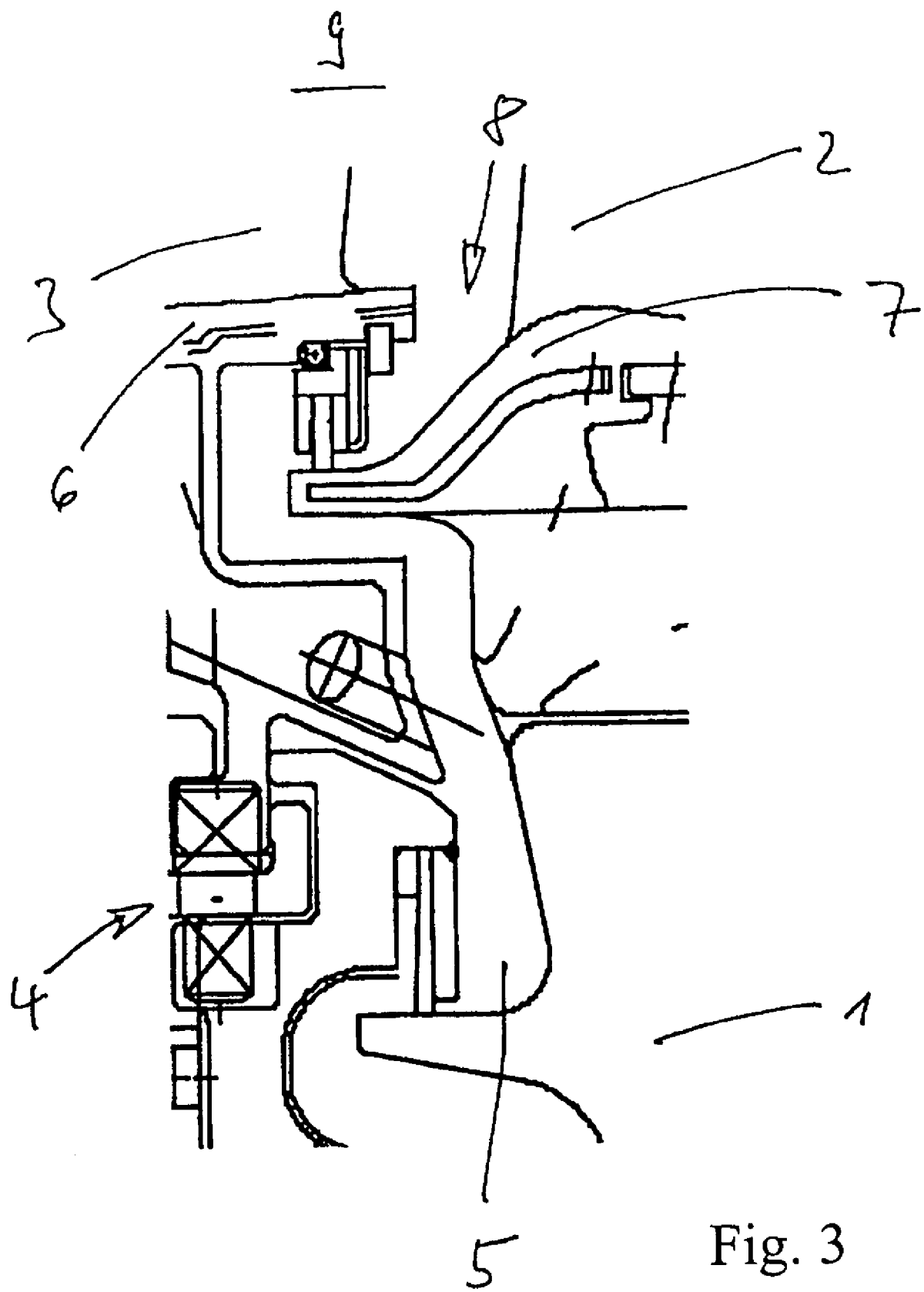
FIG. 3 is a partial longitudinal section, analogically to FIGS. 1 and 2, of a second embodiment in accordance with the present invention.

FIG. 3 shows a second embodiment according to the present invention which is essentially designed similarly to the first embodiment shown in FIG. 2. Other than the first embodiment, the seal 8 is here of the brush type. Again, the seal lies essentially on a concentric circle, i.e. it is not radially stepped or otherwise offset, as known from the state of the art. The advantages of the design shown in FIG. 3 are similar to those of the embodiment according to FIG. 2.

LIST OF REFERENCE NUMERALS

1 Turbine disk
2 Rotor blade
3 Stator blade
4 Stator ring
5 Lateral wheel cavity
5*a* Inner chamber
5*b* Outer chamber
6 Stator blade platform
7 Rotor blade platform
8 Seal
9 Main gas duct
10 Center axis
11 Seal

What is claimed is:

1. A high-pressure turbine of a gas-turbine engine comprising:
   a turbine disk carrying rotor blades and rotor blade platforms,
   a stator ring carrying stator blades and stator blade platforms,
   a lateral wheel cavity formed between the turbine disk and the stator ring, and
   a seal provided in an axial direction between the stator blade platforms and the rotor blade platforms which is arranged radially outwardly from a center axis of the high-pressure turbine and adjacent a main gas duct;
   wherein the lateral wheel cavity is a single cavity, the rotor blade platforms form a seal runner and the seal is a crocodile-type segmented labyrinth seal with labyrinth tips positioned on the blade platforms.

2. A high-pressure turbine in accordance with claim 1, wherein the rotor blade platforms form a segmented seal runner.

3. A high-pressure turbine of a gas-turbine engine comprising:
   a turbine disk carrying rotor blades and rotor blade platforms,
   a stator ring carrying stator blades and stator blade platforms,
   a lateral wheel cavity formed between the turbine disk and the stator ring, and
   a seal provided in an axial direction between the stator blade platforms and the rotor blade platforms which is arranged radially outwardly from a center axis of the high-pressure turbine and adjacent a main gas duct, wherein the seal is of a brush type, with individual brush elements positioned on the rotor blade platforms.

4. A high-pressure turbine in accordance with claim 3, wherein the seal includes brush elements attached to the stator ring and with the rotor blade platforms forming a segmented seal runner.

5. A sealing arrangement for a high-pressure turbine of a gas-turbine engine having
   a turbine disk carrying rotor blades and rotor blade platforms,
   a stator ring carrying stator blades and stator blade platforms and
   a lateral wheel cavity formed between the turbine disk and the stator ring,
   the sealing arrangement comprising a seal provided in an axial direction between the stator blade platforms and the rotor blade platforms which is arranged radially outwardly from a center axis of the high-pressure turbine and adjacent a main gas duct, wherein the seal is of a brush type, with individual brush elements positioned on the rotor blade platforms.

* * * * *